United States Patent Office 3,660,562
Patented May 2, 1972

3,660,562
METHOD AND COMPOSITIONS FOR IMPROVING FEED EFFICIENCY OF RUMINANTS
George M. Grass, Jr., Phoenixville, Roger C. Parish, King of Prussia, and John E. Trei, Malvern, Pa., assignors to Smith Kline & French Laboratories, Philadelphia, Pa.
No Drawing. Filed June 24, 1970, Ser. No. 49,558
Int. Cl. A23k 1/175
U.S. Cl. 424—78
9 Claims

ABSTRACT OF THE DISCLOSURE

Compositions and a method of improving feed efficiency of ruminant animals by inhibiting methanogenesis in the rumen utilizing encapsulated or coated volatile liquid or solid hydrocarbons having at least two halo atoms and from one to six carbon atoms. Preferred compounds to be used as the active ingredient are chloroform, carbon tetrachloride, methylene chloride and hexachloroethane.

---

This invention relates to novel ruminant feed compositions and to a new method of improving feed efficiency in ruminants using these compositions. More specifically, this invention relates to ruminant feed compositions containing volatile liquids or solids in an encapsulated or coated form useful for the inhibition of rumen methanogenesis.

It is known that microorganisms within the rumen metabolize carbon compounds to useful volatile fatty acids such as, for example, propionic and butyric acids. These acids are more readily utilized by the ruminant to increase the efficiency of rumen digestion and thereby conserve energy for more productive work in the ruminant animals. Other end products of rumen metabolism or fermentation are gases such as carbon dioxide and methane. While the fatty acid metabolites provide utilizable energy for the ruminant, methane has no energy value and is eliminated primarily by eructation. It has been estimated that ruminants lose approximately from about 6% to 15% of their total food energy in methane losses. Therefore, there has been a search for compounds that would effectively inhibit methanogenesis in the rumen and produce a higher ratio of the desirable volatile fatty acids, particularly propionic and butyric. Further, the reduction of methane generated should be accomplished without adversely reducing the overall rate of fermentation.

It has been shown by Bauchop, T., J. Bacteriol. 94: 171–175 and confirmed by Rufener and Wolin, Appl. Microbiol. 16: 1955–1956 that chlorine-containing analogues of methane such as, for example, carbon tetrachloride, chloroform and methylene chloride inhibited rumen methanogenesis with an accompanying increase in the production of the useful propionic and butyric acids. In addition the work of Rufener and Wolin demonstrated that the production of the volatile fatty acids was unaffected by concentrations that inhibited methane formation except for the changes in the proportions, i.e., acetic acid is decreased while propionic and butyric were increased. Further, Prins and Seekles, J. Dairy Sci. 51, 882–87, 1968, demonstrated that chloral hydrate and its microbial degradation products, trichloroethanol and chloroform, influence the products of fermentation in the rumen, i.e., inhibits the overall fermentation pattern.

Although these above mentioned compounds have been proven to inhibit rumen methanogenesis and increase the production of the desirable volatile fatty acids, they have not been commercially exploited for this purpose. The main reason is because all these compounds are supplied as liquids which are volatile or solids which have low melting points and/or sublime or evaporate. They are therefore not suitable or adaptable for preparation into practical and convenient dosage forms for commercial field or pen feeding. Ideally active ingredients employed for ruminant treatment are combined with appropriate carriers as vehicles and incorporated into solid animal feeds for oral administration. The compounds should also be capable of uniform distribution throughout a standard animal feed carrier to form a premix or concentrate. These premixes can then be mixed with either a normal or special fattening diet of the ruminant.

However, the major disadvantage of the chlorine-containing analogues of methane mentioned above is that they are volatile liquids with a characteristic unpleasant odor and taste. Very difficult to handle and often poorly dispersed in solid feed mixes, these compounds are presently administered either by dosing the rumen of fistulated animals or by intraruminal injection. Due to their volatility, odor and taste, they cannot very well be mixed directly with dry animal feed for oral consumption by the ruminant on a practical basis. The proper dosage and an adequate mixture cannot be maintained due to evaporation. Further, the animals would rebel to the odor present in the feed mix.

It is therefore the principal object of this invention to provide improved oral dosage form ruminant feed compositions containing volatile liquids or solids useful in the inhibition of methanogenesis in a stable essentially nonvolatile form with acceptable odor and taste characteristics.

It is a further object of this invention to provide for a method of incorporating volatile liquid or solid compounds with solid dry animal feed mix in such a manner that the compounds can be evenly dispersed to give a homogeneous mix with the prevention of loss of the volatile ingredient due to evaporation or sublimation.

We have unexpectedly discovered that volatile polyhalohydrocarbons may be micro-coated using various resins to form small spheres which despite this coating are very effective in inhibiting methanogenesis following injestion by ruminant animals.

According to the present invention, the volatile liquid ingredients employed to inhibit methanogenesis, such as, for example, carbon tetrachloride, are encapsulated within a wall material that keeps the liquid from being dissipated during ordinary handling under storage conditions. The volatile liquid active ingredients are converted to a solid form which renders them essentially nonvolatile. The active ingredients can now be evenly dispersed in solid feed mixes which could be stored for prolonged periods without deterioration or loss of strength due to evaporation. It has been unexpectedly discovered that both the unpleasant odor and taste associated with the volatile liquids employed to inhibit rumen methanogenesis has been considerably reduced or eliminated by encapsulating the liquids into a solid form.

The process of microencapsulation of liquids which results in dry, free-flowing capsules is well known to the art. There are several process variations regarding the encapsulation of liquids. However, the fundamental concept involves dispersing or emulsifying the liquid to be encapsulated in a liquid medium containing the wall or coating material. The wall material is then treated in such a manner to induce coacervation, i.e., concentration and separation of the wall material. The viscous wall material then deposits around and completely coats droplets of the liquid. The resinous coated material is then solidified and dried to produce capsules in a free-flowing powdery form. The droplets of liquid are centrally located in the capsule and are protected by the wall or coating material.

The coacervation step may be brought about by pH adjustment or addition of salts and other materials. The wall or coating material used for the liquids may be various resins known to the art for coating especially in the pharmaceutical field, such as, for example, gelatin, gum-arabic, synthetic colloids such as polyethylene-maleic anhydride copolymer, methyl vinyl ether-maleic anhydride copolymer or mixtures of these, albumen, sodium alginate casein, agar, starch, pectins, carboxymethylcellulose or Irish Moss.

The complete description of the microencapsulation process discussed above can be found in United States Pats. Nos. 2,800,457 and 2,800,458. The method for encapsulating volatile liquids such as carbon tetrachloride is specifically outlined in United States Pat. No. 2,980,941.

Other processes for the encapsulation of liquids may be employed such as, for example, those described in United States Pat. No. 3,389,194. This patent discloses a method for mass producing small encapsulated spherical particles using special apparatus. The liquid filler and coating or film material are extruded from separate outlets within a confined stream of a carrier fluid flowing at a greater speed and in the same direction as the extrusion material. The extruded rods are then broken off and formed into individual particles. These particles, suspended in the carrier fluid, are then introduced into a hardening medium thereby producing small solid spherical particles.

The volatile solids such as hexachloroethane can be coated by one of several well known methods. The above described coacervation is one method that can be used. The various spray drying techniques known to the art can also be employed to coat hexachloroethane. The spray drying is carried out in apparatus conventionally used for spray drying. The conditions may vary within wide ranges. It is, however, preferred to use a minimum initial temperature (inlet) of about 50° C. and a maximum terminal temperature (outlet) of about 150° C.

A more detailed description of carrying out the spray drying process could be found in United States Pats. Nos. 3,079,303 and 3,382,150.

Following are some specific examples of the encapsulation and coating processes described above.

Encapsulation of carbon tetrachloride 250 ml. of carbon tetrachloride is added dropwise into a mixture consisting of 280 grams of an 11% by weight of aqueous gum-arabic solution, 280 grams of an 11% by weight of aqueous gelatin solution, 60 ml. of a 2% by weight of aqueous solution of polyethylenemaleic anhydride copolymer and 1300 ml. of water at a pH of 9. The pH of the mixture is adjusted to 7 and the temperature maintained at 35° C. The ingredients are continuously stirred and the pH lowered to 5 with addition of 10% acetic acid dropwise. This results in the coacervation of the polymeric material and in the forming of the initial wall around the droplets of carbon tetrachloride. The pH is again raised to 5.5 using a 20% aqueous solution of sodium hydroxide. 70 ml. of a 2% solution of polyethylenemaleic anhydride copolymer is added and the temperature allowed to drop to 30° C. This causes the formation of a second and thicker wall around the droplets of carbon tetrachloride. An aqueous 20% solution of glutaraldehyde (20 cc.) is then added to harden the finished capsules.

Coating of hexachloroethane—Method I

Into a mixing vessel is introduced 100 ml. of a 2.4% aqueous solution of polyethylenimine, 100 ml. of a 0.6% aqueous solution of polyethylenemaleic anhydride, 100 ml. of a 4% aqueous solution of gum-arabic and 200 ml. of water. The polymer solution is mixed at room temperature and pH is adjusted to 9 which is above the coacervation range. 15 grams of hexachloroethane are added and the pH is lowered to 7.5 by addition of 10% acetic acid. At this pH the coacervation of the polymeric material takes place and forms a wall around each particle of hexachloroethane. The wall is then hardened by adding, while stirring, 10 mls. of a 25% solution of glutaraldehyde.

Coating of hexachloroethane—Method II

Hexachloroethane: 200.0 gm.
Methylcellulose: 6.0 gm.
Distilled water: 200.0 cc.

The methylcellulose is added to 100 cc. of boiling water. Ice formed from 100 cc. of water is added and the mass stirred until solution is complete. The hexachloroethane is added and dispersed in the methylcellulose solution by stirring. The suspension is then spray dried with an inlet temperature of 188° C. and an outlet temperature of 92° C. to yield dry, coated hexachloroethane particles.

The volatile liquids or solids which can be encapsulated or coated according to the above described techniques and which may be employed in the novel ruminant feed compositions and method of improving feed efficiency as outlined in the invention would include any of the following well known liquid or low melting solid polyhalogenated hydrocarbons having at least two halo atoms (chloro or bromo) and from one to six carbon atoms such as, for example, chloroform, carbon tetrachloride, methylene chloride, bromochloromethane, dibromomethane, bromoform, trichlorofluoromethane, dichloroethane, trichloroethane, trichloropropane, heptachloropropane, tetrachloropropane, trichloroethane, hexachlorocyclopentadiene, hexachloroethane, chloral hydrate, chloral, trichloro-2-propanone, ethyl 2,2,2-trichloroacetate, and ethyl 3-bromopropionate.

The above encapsulated or coated compounds are incorporated into feed or feed premix compositions in effective but nontoxic and nontherapeutic quantities which increase feed efficiency. The compositions are then fed to ruminant animals as usual in the agricultural art.

The ruminant feeds most generally used with the method of this invention are either the roughage feeds such as silage or various commercial grain mixtures commonly used in ruminant animals, that is, in cattle or sheep. The amount of encapsulated or coated volatile liquid or solid additive used to supplement such feeds will be an amount sufficient to improve the feed efficiency of the animal but not to have a pharmacodynamic or otherwise toxic or noxious effect. The amount of additive would be, for example, in the broad range of from about 2 g. to 2 kg. per ton of feed, preferably from about 10 g. to about 600 g./ton. An average sheep will ingest about 3–4 lbs. of food daily, an average cow about 20–25 lbs. Therefore, the broad range of dosage for ruminants (sheep to cows) is roughly about 10 mg. to 7 g. per day.

Most advantageously, encapsulated or coated chloroform, carbon tetrachloride, methylene chloride or hexachloroethane may be present from about 50 g. to about 200 g. per ton of feed in carrying out the method of this invention.

For commercial use, the active ingredients are most readily used as premix formulations in which the encapsulated coated material is uniformly distributed throughout a standard animal feed carrier in an amount to give active levels of chemical ingredient at tonnage amounts as described above when diluted to whole feed. This premix or concentrate is mixed with either a normal or a special fattening diet of the ruminant, as desired. Examples of such carriers are soybean meal, corn oil, ground corn, barley, wheat, mineral mixtures such as, for example, vermiculite, diatomaceous earth, corn gluten meal, corn distillers solubles or soyflour. The active ingredient will be in amounts to satisfy the criteria set forth above for whole feed and will usually be present in from about 5% to about 75% by weight of the premix composition.

The animal feeds themselves may also contain cellulosic roughage such as cellulose, hay, stray, corn stalks, cotton seed hulls, oats, barley and cereal brans, natural oils, such as, for example, animal fats, fish oils, safflower oil, peanut oil and cottonseed oil, antioxidants, minerals, vitamins, antibiotics, anthelmintics and other appropriate medicaments.

A typical prepared animal feed is as follows:

Mixed hay: 40.0%
Ground yellow corn: 45.0%
Soybean oil meal: 7.0%
Cane molasses: 7.0%
Dicalcium phosphate: 0.5%
Trace minerals salt: .5%
Vitamin A: 300 I.U./lb.
Vitamin D: 150 I.U./lb.
Coated hexachloroethane: 100 g./ton of feed Similar animal feeds may be prepared using an equivalent amount of the other above noted encapsulated chemical compounds.

An example of a suitable premix is as follows:

Encapsulated carbon tetrachloride: 200 g.
Ground yellow corn: 5 lb.

This mix may be added to a ton of feed.

The method of this invention comprises allowing the ruminants to graze or be fed ad libitum on the supplemented rations or to be fed on a regular fattening schedule.

The ability of the encapsulated polyhalogenated hydrocarbons of this invention to improve feed utilization in ruminants is primarily evaluated by means of a test which measures methane gas production plus total gas production as an indicator of the rate of fermentation of feedstuffs by microorganisms of the rumen. Rumen fluid samples are taken from the animal and subjected to gas analysis. The trapped gases are run through a gas partitioner (column chromatography) which separates and quantitates the components. The liquids (volatile fatty acids, etc.) are analyzed by gas liquid chromatography. Among the products measured are carbon dioxide, lactic acid, ethanol, hydrogen, ammonia nitrogen and fatty acids having from 2 to 6 carbon atoms. Reduction in the percent methane produced of 20% is considered significant. However, with compounds used in the present invention, reduction of about 90% without reduction of overall fermentation is not uncommon.

The ability of a particular compound to reduce the amount of methane generated without adversely reducing the overall rate of fermentation is determined by comparing the total ($\mu$moles/ml.) volatile fatty acids produced in control systems with those containing test compound.

The effect of encapsulating or coating polyhalogenated volatile liquid or solid compounds as disclosed in this invention in reducing methane production without causing a reduction in the rate of overall fermentation, when tested by the above procedure, is demonstrated by the following in vivo experiment. The study was designed to observe the suppression of methane in rumen gas samples and the change in volatile fatty acids in rumen liquid samples.

Carbon tetrachloride capsules (70 mg./feeding) were sprinkled on 300 g. of a special meal feed diet and fed to three sheep all weighing approximately 80 lbs. two times a day. The total daily dose was 140 mg. per animal and treatment continued for four days. Gas samples were taken at 4 and 18 hours after feeding during the treatment period. Rumen liquid samples were taken on day 1 and day 4. Analysis of the samples by gas partitioner and gas liquid chromatography for gas and fatty acid content were carried out. The results showed that there was suppression of methane in all three sheep. The level of suppression was approximately 70% to 90%. This suppression remained during the treatment period with no indication of returning to the original level.

In regard to the rumen volatile fatty acids treatment with encapsulated carbon tetrachloride showed an average of 30% decrease in acetic acid, 27% increase in propionic acid, 15% increase in butyric acid and approximately a 3% decrease in total $\mu$mole/ml. of UFA in comparison to control.

It is apparent from the above in vivo experiment that the method of administering the encapsulated volatile compounds as described in this invention improves the feed utilization of ruminant animals by inhibiting methanogenesis in the rumen without affecting the overall rate of fermentation.

We claim:
1. The method of improving the feed efficiency of ruminant animals comprising administering orally to such animals an effective but nontoxic quantity of a free flowing powdered resin encapsulated volatile liquid or solid polyhalogenated hydrocarbon having from 1 to 6 carbon atoms and having at least two bromo or chloro atoms.
2. The method of claim 1 wherein the quantity of encapsulated hydrocarbon is from about 2 g. to about 2 kg. per ton of feed.
3. The method of claim 1 wherein the quantity of encapsulated hydrocarbon is from about 10 g. to about 600 g. per ton of feed.
4. The method of claim 1 wherein the qauntity of encapsulated hydrocarbon is from about 10 mg. to about 7 g. per ruminant per day.
5. The method of claim 1 wherein the encapsulated or coated polyhalogenated hydrocarbon is selected from the group consisting of chloroform, carbon tetrachloride, methylene chloride, or hexachloroethane.
6. The method of calim 5 werein the qauntity of hydrocarbon is from about 50 g. to about 200 g. per ton of feed.
7. An animal feed composition comprising a free flowing powdered resin encapsulated volatile liquid or solid polyhalogenated hydrocarbon having from 1 to 6 carbon atoms and having at least two bromo or chloro atoms uniformly dispersed throughout a solid animal feed mix.
8. The animal feed of claim 7 wherein the encapsulated hydrocarbon is present from about 10 g. to about 600 g. per ton of feed.
9. The animal feed of claim 7 wherein the polyhalogenated hydrocarbon is selected from the group consisting of chloroform, carbon tetrachloride, methylene chloride of hexachloroethane.

References Cited

UNITED STATES PATENTS

| | | | |
|---|---|---|---|
| 1,703,377 | 2/1929 | Anderson | 424—350 X |
| 2,111,504 | 3/1938 | Bockmühl et al. | 424—350 X |
| 2,543,580 | 2/1951 | Kay | 424—350 X |
| 2,580,683 | 1/1952 | Kreuger | 424—350 X |
| Re. 24,899 | 11/1960 | Green | 252—316 |
| 2,980,941 | 4/1961 | Miller | 15—104.93 |

OTHER REFERENCES

Bauchop, T. J. of Bacteriology, vol. 94, pp. 171–175, July 1967.

Rufener et al., Applied Microbiology, vol. 16, pp. 1955–1956, December 1968.

Chemical Asbtracts, vol. 61, 4158(f), 1964, R. E. Phares et al.

Veterinary Drug Encyclopedia and Therapeutic Index, 9th edition, pp. 161 and 252, 1968.

NORMAN YUDKOFF, Primary Examiner

K. VAN WYCK, Assistant Examiner

U.S. Cl. X.R.

99—2 CD; 424—350